(12) United States Patent
Semenyuk

(10) Patent No.: US 8,117,149 B1
(45) Date of Patent: Feb. 14, 2012

(54) PREDICTION WEIGHTING METHOD BASED ON PREDICTION CONTEXTS

(75) Inventor: Vladimir V. Semenyuk, Stockholm (SE)

(73) Assignee: Smith Micro Software, Inc., Aliso Viejo, CA (US)

( * ) Notice: Subject to any disclaimer, the term of this patent is extended or adjusted under 35 U.S.C. 154(b) by 608 days.

(21) Appl. No.: 12/208,296

(22) Filed: Sep. 10, 2008

Related U.S. Application Data

(60) Provisional application No. 60/971,739, filed on Sep. 12, 2007.

(51) Int. Cl.
*G06F 15/00* (2006.01)
*G06F 15/18* (2006.01)
*G06K 9/36* (2006.01)
*G06K 9/46* (2006.01)

(52) U.S. Cl. ............................ 706/62; 382/238; 382/239

(58) Field of Classification Search ..................... None
See application file for complete search history.

(56) References Cited

U.S. PATENT DOCUMENTS

| | | | | |
|---|---|---|---|---|
| 5,680,129 | A * | 10/1997 | Weinberger et al. | 341/65 |
| 5,903,676 | A * | 5/1999 | Wu et al. | 382/244 |
| 6,785,425 | B1 * | 8/2004 | Feder et al. | 382/247 |
| 2005/0254717 | A1 * | 11/2005 | Kalevo et al. | 382/238 |
| 2010/0054616 | A1 * | 3/2010 | Kim | 382/238 |

OTHER PUBLICATIONS

Memon et al.; "Lossless Image Compression: A Comparative Study"; 1995; Proceedings of SPIE vol. 2418; pp. 8-20.*

Wu et al.; "Context-Based, Adaptive, Lossless Image Coding"; 1997; IEEE Transactions on Communications, vol. 45, No. 4; pp. 437-444.*

Motta et al.; "Lossless Image Coding via Adaptive Linear Prediction and Classification"; 2000; Proceedings of the IEEE, vol. 88, No. 11; pp. 1790-1796.*

Meyer et al.; "Glicbawls—Grey Level Image Compression by Adaptive Weighted Least Squares"; 2001; Proc. of 2001 Data Compression Conf.; pp. 1-12.*

Ye et al.; "A Weighted Least Squares Method for Adaptive Prediction in Lossless Image Compression"; 2003; CiteSeerX—Scientific Literature Digital Library and Search Engine; 5 pages.*

Weinberger, Marcelo J. et al.; "LOCO-I: A Low Complexity, Context-Based, Lossless Image Compression Algorithm"; 1996; Proceedings IEEE Data Compression Conference, Snowbird, Utah; 11 pages.*

* cited by examiner

*Primary Examiner* — Jeffrey A Gaffin
*Assistant Examiner* — Stanley K Hill
(74) *Attorney, Agent, or Firm* — Craig M. Stainbrook; Stainbrook & Stainbrook, LLP

(57) ABSTRACT

A method for prediction weights determination for use in compression (particularly image compression) and forecasting applications. Prediction weights determining significance of different predictions when calculating generalized prediction are calculated using specific context-based procedure. Information about already known best predictions in close neighborhood of the position being processed is used to form prediction context. Number of times each particular prediction was the best prediction in past in current prediction context is treated as a prediction weight.

4 Claims, 1 Drawing Sheet

PREDICTION WEIGHTING METHOD BASED ON PREDICTION CONTEXTS

CROSS REFERENCES TO RELATED APPLICATIONS

The present application claims the benefit of U.S. Provisional Patent Application Ser. No. 60/971,739, filed Sep. 12, 2007.

SEQUENCE LISTING

Not applicable.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates generally to data compression, and more particularly to a method to make efficient weighting of predictions of image colors at different image positions of for use in lossless image compression.

2. Discussion of Related Art Including Information Disclosed Under 37 CFR §§1.97, 1.98

Image compression is based on the generation of economical code. Colors at different image positions may be encoded using entropy coding methods in which color appearance probability distribution determines entropy codes. The efficiency of entropy encoding is almost the same as entropy of this distribution. Color appearance probability distribution at each image position can be predicted. Higher efficiency is achieved when prediction depends on information about already encoded/decoded colors at adjacent positions. Different combinations of already encoded/decoded data form informational contexts. Different contexts determine different predictions. In order to find generalized probability estimation different predictions may be combined using weighting: each prediction has its weight; weight determines significance of corresponding prediction; generalized probability distribution is calculated as a weighted superposition of probability distributions corresponding to different predictions.

Additionally, prediction weights can be used for calculation of weighted superposition of independent predictions of most probable value at each position to be processed (e.g. color value). Result of this superposition is a generalized prediction of most probable value. In many existing compression methods most probable values are of fundamental importance.

The determination of prediction weights is the main problem of weighted generalization. In order to make better predictions (for higher compression) it is necessary to rank predictions, so that more efficient predictions are given bigger weights. Prediction efficiency is determined by the size of corresponding entropy code. Entropy code size depends on the particular color value, which is considered as not available until it is processed during symmetrical data processing. Thus, code size is unknown a priori. It would be advantageous to find the method of a priori prediction ranking which gives the smallest possible code. Moreover, it is desirable that this ranking method is of low complexity so it could be used in practical applications.

The conventional approach for weighting of predictions entails the use of predefined static weights. Static weights can be assigned according to statistical results obtained beforehand, for example, during processing of some set of test images. More efficient dynamic ranking methods are based on collection of statistical information about efficiency of different predictions during image processing: weight of each prediction is a function of its efficiency in past. Weights could be also calculated with the use of color information from already processed image positions adjacent to the image position being processed or as a result of complicated learning (with the use of neural networks, weighted trees etc). Present method is based on simpler, but at the same time very efficient weighting solution. Weights are calculated using information about already known best predictions in close neighborhood of the position being processed. Indexes of known best predictions at already processed adjacent image positions form an auxiliary prediction context, which becomes a base for context-dependent prediction statistics collection. Number of times each particular prediction was the best prediction in past in current prediction context is treated as a prediction weight. Present context-based weighting method is a very effective solution for lossless image compression.

Further, the presently inventive method of prediction weighting can be used for prediction of samples of other data types; especially multidimensional.

Accordingly, the present invention provides a universal method that can be successfully used in many compression applications and applications related to forecasting.

It must be emphasized that while many other weighting solutions involve significant computational complexity, the present invention provides a better level of prediction efficiency and is incomparably fast due to its simplified procedure for weight determination.

In the case of limited computational resources, compression efficiency remains at the highest level when employing the present invention.

Further, because of prediction context formation flexibility, the present invention provides means to make prediction weighting while using a system having limited memory resources.

BRIEF SUMMARY OF THE INVENTION

The present invention is a method of prediction weights determination. The method, when applied to image data at any position, employs the following four principal method steps:

Determining the Prediction Context, which includes two substeps, namely: collecting about the best predictions for already processed positions adjacent to the current position. (e.g. left, above, above-left etc), resulting in indexes of best predictions; and then determining the prediction context, which is some combination of the best prediction indexes. A context formation rule is defined beforehand and must depend on specific application conditions.

Next, calculating the prediction weight. For each prediction there are two elements in the weight calculation step:

using stored statistical information to determine the number of times the prediction was the best prediction in the same prediction context; and using this number as the prediction weight.

The next step is determining the best prediction for the current image position after its processing.

The final step is updating statistical information (if any) using the determined best prediction index for the current prediction context.

The same steps will be applied to the data of other types, taking into consideration the specific meaning of adjacent positions.

It should be noted that the way the weights determination is novel, unrelated to the way in which other existing methods work, and achieves comparable or better results.

It is therefore an object of the present invention to provide a new and improved method for prediction weighting.

A still further object of the present invention is to provide a method for effective prediction weighting and predicts image samples with increased precision by computing better prediction weights.

Yet another object of the present invention is to provide a method for effective prediction weighting that can be used in software libraries and utilities for predictive lossless compression of grayscale and color images.

A further object is to provide an improved method of prediction weighting that may be implemented in hardware devices that employ predictive lossless image compression, such as digital cameras, mobile cellular phones, medical imaging equipment, and so forth.

A still further object is to provide an improved method of prediction weighting that may be employed in predicting 2D image samples, such as weather maps, seismic data, and the like, for use in forecasting future events.

Still another object is to provide a method of prediction weighting for use in forecasting economic trends and events, such as currency rates, stock prices, and so forth.

The novel features characteristic of the invention, as to system organization and the method of operation, together with further objects and advantages thereof will be better understood from the following description considered in connection with the accompanying drawings, in which a preferred embodiment of the invention is illustrated by way of example. It is to be expressly understood, however, that the drawings are for illustration and description only and are not intended as a definition of the limits of the invention. The various features of novelty that characterize the invention are pointed out with particularity in the claims annexed to and forming part of this disclosure. The invention does not reside in any one of these features taken alone, but rather in the particular combination of all of its structures for the functions specified.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
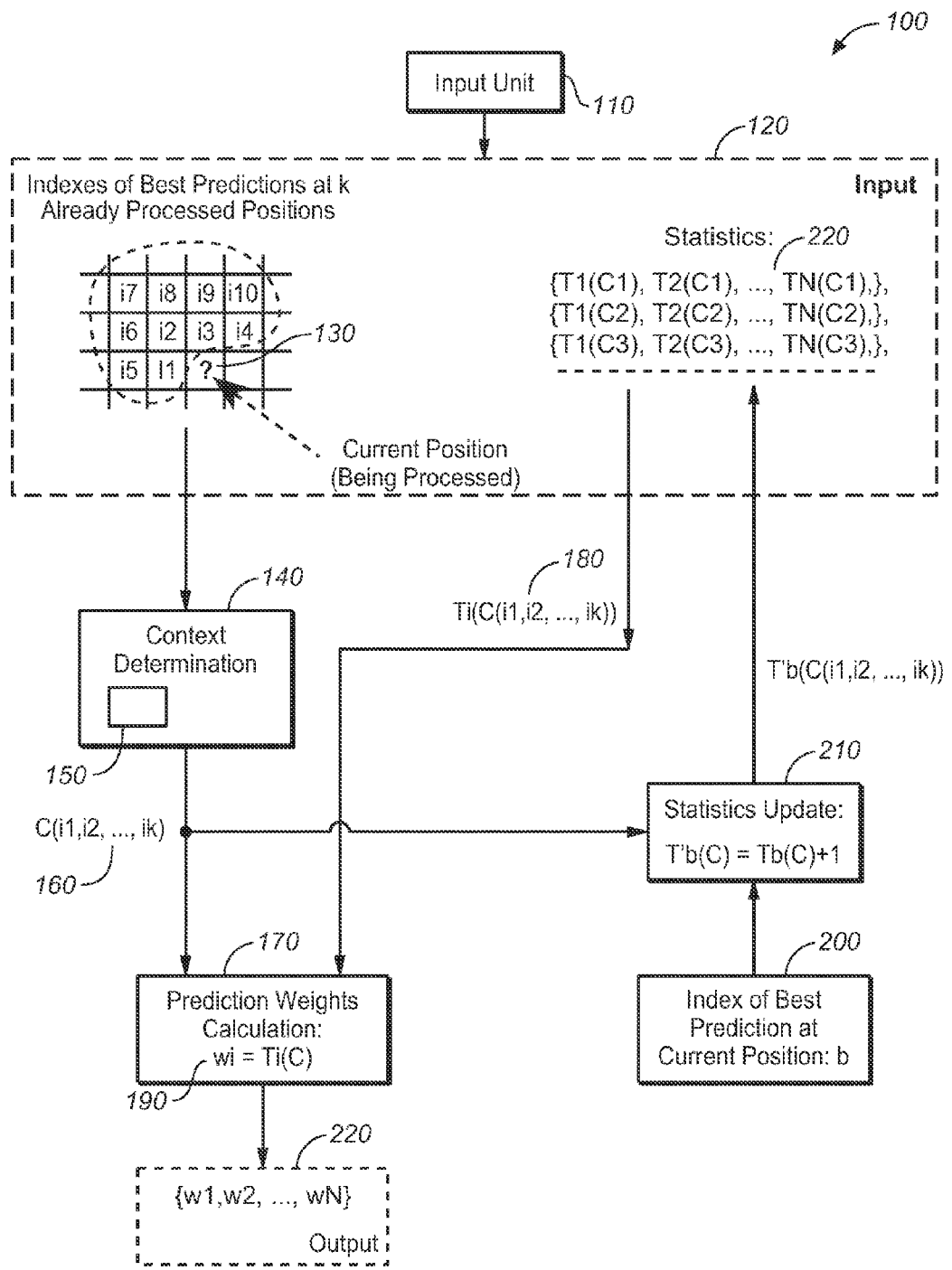
FIG. 1 is a schematic flow chart showing the method steps of the prediction weights determination process of the present invention.

Referring to FIG. 1 there is illustrated therein a new and improved method for prediction weighting. The method is especially well-suited for use in lossless image compression because it facilitates the more precise prediction of image samples by computing better prediction weights. In considering the method steps set out in FIG. 1 and described herein, the following definitions apply:

The term "code," as used herein, means data representation in the form of sequence of informational units (bits, bytes etc.). Term "economical code" means economical data representation.

As used herein term "coding efficiency" means average size of output code in informational units per input symbol. Term "input symbol" means base unit of information to be encoded.

As used herein term "context" means concomitant data or numerical denotation of concomitant data.

The term "coding efficiency," as used herein, means average size of output code in informational units per input symbol.

The term "input symbol" means base unit of information to be encoded.

The term "context," as used herein, means concomitant data or numerical denotation of concomitant data.

The term "weight" means a number determining the contribution of something to something else.

Additionally, the phrase "weighted superposition of probability distributions" means the following: Let i be the index of prediction; $p_i$=the probability of color appearance estimated with the use of i-th prediction; $\omega$ weight of i-th prediction. Then generalized probability of color appearance is calculated using formula $$\frac{\sum_{i=1}^{N} \omega \cdot p_i}{\sum_{i=1}^{N} \omega},$$

where N–number of different predictions.

The phrase "weighted superposition of independent predictions of most probable value" means the following. Let i be the index of prediction; $v_i$ is the most probable value calculated with the use of i-th prediction; $\omega$ is the weight of i-th prediction. Then most probable value calculated with the use of generalized prediction is defined by formula $$\frac{\sum_{i=1}^{N} \omega \cdot v_i}{\sum_{i=1}^{N} \omega},$$

where N–number of different predictions.

Additionally, as used herein the term "best prediction" means the most efficient prediction in the selected set of predictions.

Referring now to FIG. 1, there is shown a schematic flow diagram setting out the essential method steps of the inventive method of prediction weights determination, said method generally denominated 100 herein. A user begins the process of the present invention with any data file employed in a technical field in which multiple predictions must be weighted or ranked. In the drawing, by way of example only, and not by way of limitation, the input may be considered a digital image file that the user wishes to compress, either for storage or for transmission. The user employs an input unit 110 containing an input data image file or stream 120. The method of the present invention then employs an application, either a server or client application, saved and running on a server or client computer, to process and compress the data file. When applied to the input image data at any location 130, the method employs the following steps:

(1) Determining the Prediction Context 140. This includes two substeps:

(1.1) First, information is collected 150 about the best predictions for already processed positions adjacent to the current position (e.g., left, above, above-left etc, above-right, below, below left, and so forth, in which case raster order processing is implied). From this substep, indexes of best predictions 160 are generated 160.

(1.2) Second, the prediction context is determined to be some combination of the best prediction indexes. A context formation rule is defined beforehand and must depend on specific application conditions.

(2) Calculating the Weight 170. For each prediction there are two elements in the weight calculation step:

(2.1) Using stored statistical information to determine the number of times, $T_i(C)$ 180, the prediction was the best prediction in the same prediction context.

(2.2) Using this number 180 as the prediction weight 190.

(3) Determining the best prediction for the current image position after its processing 200.

(4) Updating 210 statistical information 220 (if any) using the determined best prediction index 200 for the current prediction context 160.

The output 220 comprises improved prediction weighting for more effective prediction of future and current samples.

The prediction weight determination step at a current position can be formalized as follows. Let $i_1, i_2, \ldots, i_k$=indexes of best prediction at k already processed adjacent positions ($i_1, i_2, \ldots, i_k \in \{1, 2, \ldots, N\}$ where N–number of different predictions); $C(i_1, i_2, \ldots, i_k)$ is the current prediction context); $T_i(C)$ is the number of times i-th prediction is the best prediction in context C in an already processed portion of data; $\omega$ is the weight of the i-th prediction. Then, the weight determination rule is $\omega = T_i(C(i_1, i_2, \ldots, i_k))$.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A method of prediction weights determination, said method comprising the steps of:
   (a) determining indexes of best predictions for already processed positions adjacent to a current position;
   (b) determining a current prediction context as a combination of the indexes determined in step (a) using a predefined context formation rule based on application-specific conditions;
   (c) using stored statistical information, determining for each prediction a number of times this specific prediction was the best prediction in the current prediction context determined in step (b) in past predictions;
   (d) using the results of step (c) as prediction weights for corresponding predictions;
   (e) determining an index of best prediction for the current position; and
   (f) updating statistical information for the current prediction context determined in step (b) and the index determined in step (e).

2. A method for determining prediction weights for use in lossless image compression, comprising the steps of:
   (a) determining indexes of best predictions for already processed positions adjacent to a current image position in 2D image space;
   (b) determining a current prediction context as a combination of the indexes determined in step (a) using a predefined context formation rule based on specifics of a lossless image compression algorithm;
   (c) determining for each prediction a number of times this specific prediction was the best prediction in the current prediction context determined in step (b) in past predictions;
   (d) using the results of step (c) as prediction weights for corresponding predictions;
   (e) determining an index of best prediction for the current image position; and
   (f) updating statistical information-for the current prediction context determined in step (b) and the index determined in step (e).

3. A method of prediction weights determination, said method comprising the steps of:
   (a) collecting information about best predictions for already processed positions adjacent to a current position and generating indexes of best predictions;
   (b) determining a current prediction context as a combination of the indexes generated in step (a);
   (c) determining for each prediction how many times this specific prediction was the best prediction in the current prediction context in past predictions;
   (d) using the results of step (c) as prediction weights for corresponding predictions;
   (e) determining a best prediction index for the current position; and
   (f) updating statistical information using the results of step (e) for the current prediction context.

4. A method for determining prediction weights for use in lossless image compression, comprising the steps of:
   (a) collecting information about best predictions for already processed positions adjacent to a current position;
   (b) creating indexes of the best predictions using the information collected in step (a);
   (c) determining a prediction context using a predefined context formation rule based on application-specific conditions and a combination of the best prediction indexes created in step (b);
   (d) calculating a prediction weight by using stored statistical information to determine a number of times a prediction was the best prediction in the current prediction context determined in step (c);
   (e) determining a best prediction index for the current position after it has been pr0cessed; and
   (f) updating statistical information using the determined best prediction index for the current prediction context.

* * * * *